(12) United States Patent  
Kawasumi et al.

(10) Patent No.: US 10,615,431 B2  
(45) Date of Patent: Apr. 7, 2020

(54) METHOD OF MANUFACTURING UNIT FUEL CELL WHICH PREVENTS EXPOSURE AND DEFORMATION

(71) Applicant: TOYOTA JIDOSHA KABUSHIKI KAISHA, Toyota-shi, Aichi-ken (JP)

(72) Inventors: Akito Kawasumi, Susono (JP); Kotaro Ikeda, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 770 days.

(21) Appl. No.: 14/877,299

(22) Filed: Oct. 7, 2015

(65) Prior Publication Data

US 2016/0104909 A1    Apr. 14, 2016

(30) Foreign Application Priority Data

Oct. 8, 2014 (JP) ................. 2014-207304

(51) Int. Cl.
| | |
|---|---|
| H01M 8/02 | (2016.01) |
| H01M 8/0273 | (2016.01) |
| H01M 8/1004 | (2016.01) |
| H01M 8/0297 | (2016.01) |
| H01M 8/0286 | (2016.01) |
| H01M 8/1018 | (2016.01) |

(52) U.S. Cl.
CPC ....... *H01M 8/0273* (2013.01); *H01M 8/0286* (2013.01); *H01M 8/0297* (2013.01); *H01M 8/1004* (2013.01); *H01M 2008/1095* (2013.01); *H01M 2300/0082* (2013.01); *Y02P 70/56* (2015.11)

(58) Field of Classification Search
None
See application file for complete search history.

(56) References Cited

U.S. PATENT DOCUMENTS

| | | | | |
|---|---|---|---|---|
| 2010/0216048 | A1* | 8/2010 | Braeuninger | H01M 4/881 |
| | | | | 429/483 |
| 2014/0004442 | A1 | 1/2014 | Mitsuta et al. | |

FOREIGN PATENT DOCUMENTS

| | | |
|---|---|---|
| JP | 2014-026799 A | 2/2014 |
| JP | 2014-029834 A | 2/2014 |
| JP | 2015-195189 A | 11/2015 |
| JP | 2015-215958 A | 12/2015 |

* cited by examiner

*Primary Examiner* — Ula C Ruddock
*Assistant Examiner* — Tony S Chuo
(74) *Attorney, Agent, or Firm* — Hunton Andrews Kurth LLP

(57) ABSTRACT

A method of manufacturing a unit fuel cell includes a step of forming an adhesive layer having ultraviolet curability and heat curability on an outer peripheral edge portion of a side surface of a membrane electrode assembly, a step of disposing a support frame so that an inner peripheral edge portion of the support frame which supports the membrane electrode assembly at an outer periphery of the membrane electrode assembly is disposed on an outer portion of the adhesive layer, and a step of disposing a second gas diffusion layer on the side surface of the membrane electrode assembly so that an outer peripheral edge portion of the second gas diffusion layer is disposed on an inner portion of the adhesive layer, and a step of integrating the membrane electrode assembly, the second gas diffusion layer and the support frame by curing the adhesive layer.

5 Claims, 6 Drawing Sheets

METHOD OF MANUFACTURING UNIT FUEL CELL WHICH PREVENTS EXPOSURE AND DEFORMATION

INCORPORATION BY REFERENCE

The disclosure of Japanese Patent Application No. 2014-207304 filed on Oct. 8, 2014 including the specification, drawings and abstract is incorporated herein by reference in its entirety.

BACKGROUND OF THE INVENTION

1. Field of the Invention

The invention relates to a method of manufacturing a unit fuel cell.

2. Description of Related Art

There is known a method of manufacturing a unit fuel cell which includes a membrane electrode assembly in which electrode catalyst layers are formed at opposite sides of an electrolyte membrane, a first gas diffusion layer disposed on one side surface of the membrane electrode assembly, a second gas diffusion layer disposed on the other side surface of the membrane electrode assembly and a support frame configured to support the membrane electrode assembly in an outer periphery of the membrane electrode assembly, the method including: a process of forming a thermoplastic adhesive layer on an outer peripheral edge portion of the other side surface of the membrane electrode assembly; a process of disposing the first gas diffusion layer on one side surface of the membrane electrode assembly, disposing the second gas diffusion layer on the other side surface of the membrane electrode assembly so that an outer peripheral edge portion of the second gas diffusion layer overlaps with an inner portion of the adhesive layer; a process of heating, compressing and integrating the first gas diffusion layer, the membrane electrode assembly, the inner portion of the adhesive layer and the second gas diffusion layer; a process of disposing an inner peripheral edge portion of the support frame on an outer portion of the adhesive layer; and a process of heating, compressing and integrating the support frame, the outer portion of the adhesive layer and the membrane electrode assembly (see, e.g., Japanese Patent Application Publication No. 2014-029834 (JP 2014-029834 A)).

In JP 2014-029834 A, the outer peripheral edge portion of the other surface of the membrane electrode assembly is covered by the adhesive layer. Thus, the outer peripheral edge portion of the membrane electrode assembly is not exposed to a supplied gas from a gap between the support frame and the second gas diffusion layer. This makes it possible to avoid generation of cracks in the membrane electrode assembly which may otherwise occur when exposed. However, there is a possibility that the support frame made of a resin is thermally deformed when heating, compressing and integrating the support frame, the outer portion of the adhesive layer and the membrane electrode assembly. Accordingly, in order to deal with this possibility, the present inventors have tried to use an adhesive agent cured by ultraviolet rays, namely an ultraviolet-curable adhesive agent. Since ultraviolet rays cannot pass through a gas diffusion layer, it is necessary to cure the adhesive agent prior to disposing the gas diffusion layer in a membrane electrode assembly. That is to say, it is necessary to form an adhesive layer by coating an ultraviolet-curable adhesive agent on an outer peripheral edge portion of a membrane electrode assembly, dispose an inner peripheral edge portion of a support frame on an outer portion of the adhesive layer, and then cure the adhesive layer with ultraviolet rays prior to disposing an outer peripheral edge portion of a second gas diffusion layer on an inner portion of the adhesive layer. However, in this case, if one tries to dispose the second gas diffusion layer on the adhesive layer cured by the ultraviolet rays, the outer peripheral edge portion of the second gas diffusion layer is propped up by and overlapped with the upper portion of the inner portion of the adhesive layer. Thus, the outer peripheral edge portion of the second gas diffusion layer is raised more upward than the remaining portion of the second gas diffusion layer. As a result, there is generated a phenomenon that flow paths of a supplied gas defined by the second gas diffusion layer and a separator existing thereon are closed in the raised portion, fibers making up the second gas diffusion layer are made fluffy in the raised portion, or an excessive surface pressure is applied to the membrane electrode assembly existing under the adhesive layer. Thus, there is a possibility that the battery performance is reduced. On the other hand, if the amount of the adhesive agent coated on the outer peripheral edge portion of the membrane electrode assembly is made small so that the adhesive layer should not reach the underside of the gas diffusion layer, there is a possibility that the outer peripheral edge portion of the membrane electrode assembly is partially exposed. A demand has existed for a technique capable of reliably integrating the support frame, the gas diffusion layer and the membrane electrode assembly without exposing the membrane electrode assembly and without deforming the support frame.

SUMMARY OF THE INVENTION

According to one aspect of the present invention, the method including: integrating a first gas diffusion layer on a first side surface of a membrane electrode assembly consisting of an electrolyte membrane and electrode catalyst layers, one of which is disposed at one side of the electrolyte membrane and the other of which is disposed at the other side of the electrolyte membrane; forming an adhesive layer having ultraviolet curability and heat curability on an outer peripheral edge portion of a second side surface of the membrane electrode assembly; disposing a support frame which supports the membrane electrode assembly at an outer periphery of the membrane electrode assembly so that an inner peripheral edge portion of the support frame is disposed on an outer portion of the adhesive layer; disposing a second gas diffusion layer so that an outer peripheral edge portion of the second gas diffusion layer is disposed on an inner portion of the adhesive layer; and integrating the membrane electrode assembly integrated with the first gas diffusion layer, the second gas diffusion layer and the support frame by curing the adhesive layer According to one aspect of the present invention mentioned above, it is possible to reliably integrate the support frame, the gas diffusion layer and the membrane electrode assembly without exposing the membrane electrode assembly and without deforming the support frame.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
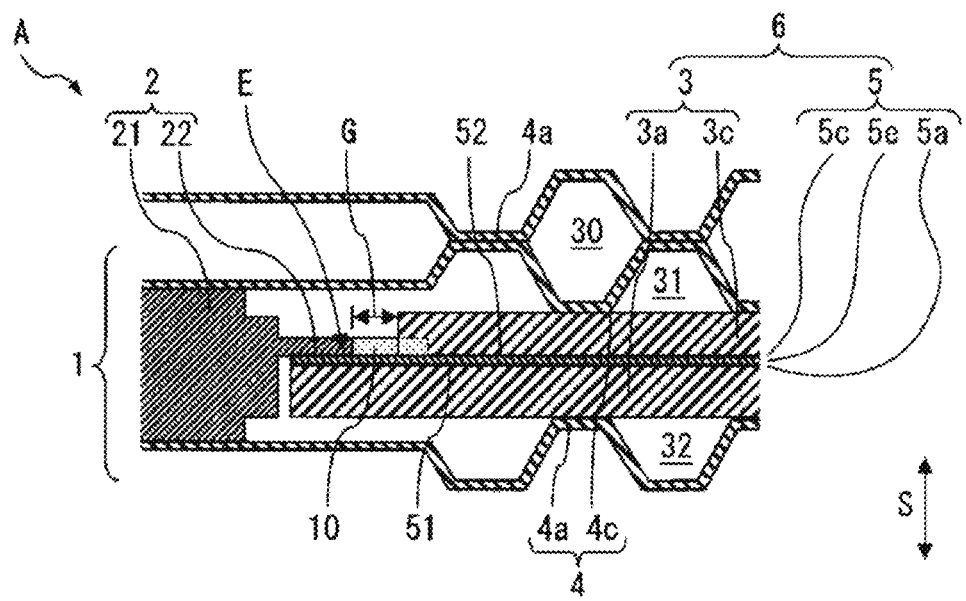
FIG. 1 is a partial sectional view illustrating a configuration example of a fuel cell stack including a unit fuel cell.

FIG. 1 is a partial sectional view illustrating a configuration example of a fuel cell stack A including a unit fuel cell 1. Referring to FIG. 1, the fuel cell stack A is formed by a stacked body in which a plurality of unit fuel cells 1 is stacked in a thickness direction S of the unit fuel cells 1. The unit fuel cell 1 generates electric power using an electrochemical reaction of a fuel gas and an oxidant gas which are supplied to the unit fuel cell 1. The electric power generated in the unit fuel cell 1 is taken out to the outside of the fuel cell stack A via a plurality of wiring lines (not illustrated) extending from terminal plates (not illustrated) disposed at the opposite ends of the stacked body to the outside of the fuel cell stack A. The electric power taken out from the fuel cell stack A is supplied to, for example, an electric motor for driving an electric vehicle or a capacitor.

The unit fuel cell 1 includes a membrane electrode assembly 5 in which electrode catalyst layers 5c and 5a are respectively formed at opposite sides of an electrolyte membrane 5e (i.e., the electrode catalyst layer 5c is formed at one side of the electrolyte membrane 5e and the electrode catalyst layer 5a is formed at another side of the electrolyte membrane 5e), a first gas diffusion layer 3a disposed on one side surface 51 of the membrane electrode assembly 5, a second gas diffusion layer 3c disposed on the other side surface 52 of the membrane electrode assembly 5 and a support frame 2 configured to support the membrane electrode assembly 5 in an outer periphery of the membrane electrode assembly 5. In the following descriptions, the first gas diffusion layer 3a and the second gas diffusion layer 3c will also collectively referred to as a gas diffusion layer 3.

Examples of a material of the electrolyte membrane 5e may include a fluorine-based polymer film having ion conductivity, such as perfluorosulfonic acid or the like. Examples of a material of the electrode catalyst layer 5a and the electrode catalyst layer 5c may include catalyst-carrying carbon which carries a catalyst such as platinum or platinum alloy. In another example, an ionomer of the same material as the electrolyte membrane is further added to the catalyst-carrying carbon. The electrolyte membrane 5e, the electrode catalyst layer 5a and the electrode catalyst layer 5c have substantially the same size. The electrolyte membrane 5e, the electrode catalyst layer 5a and the electrode catalyst layer 5c substantially overlap with one another when the membrane electrode assembly 5 is formed by disposing the electrode catalyst layers 5c and 5a at the opposite sides of the electrolyte membrane 5e. In an alternative example, at least one of the electrode catalyst layer 5a and the electrode catalyst layer 5c is smaller in size than the electrolyte membrane 5e.

Examples of a material of the gas diffusion layer 3 may include a porous body having conductivity, e.g., a carbonaceous porous body such as carbon paper, carbon cloth, glass-like carbon or the like and a metallic porous body such as metal mesh, metal foam or the like. In another example, a material having strong water repellency such as polytetrafluoroethylene or the like is impregnated to the porous body to such an extent that porosity is not lost. In a further example, a mixed layer of material having strong water repellency and carbon particles is provided on one side surface of the porous body. The first gas diffusion layer 3a has substantially the same size as the membrane electrode assembly 5. The membrane electrode assembly 5 and the first gas diffusion layer 3a substantially overlap with each other when the first gas diffusion layer 3a is disposed on one side surface 51 of the membrane electrode assembly 5. On the other hand, the second gas diffusion layer 3c has a slightly smaller size than the membrane electrode assembly 5. When the second gas diffusion layer 3c is disposed on the other side surface 52 of the membrane electrode assembly 5, an edge region extending along the outer periphery, namely an outer peripheral edge portion E, of the other side surface 52 of the membrane electrode assembly 5 is exposed without being covered with the second gas diffusion layer 3c. In other words, on the other side surface 52 of the membrane electrode assembly 5, the outer peripheral edge portion E surrounds the outer side of the second gas diffusion layer 3c. A membrane-electrode-gas diffusion layer assembly 6 is configured by the membrane electrode assembly 5 and the first gas diffusion layer 3a and the second gas diffusion layer 3c disposed on the opposite side surfaces of the membrane electrode assembly 5.

The support frame 2 is a frame which supports the membrane electrode assembly 5 (or the membrane-electrode-gas diffusion layer assembly 6) at the outer periphery thereof. Examples of a material of the support frame 2 may include a plate having electrical insulation and airtightness, e.g., a plate made of a resin such as polypropylene, a phenolic resin, an epoxy resin, polyethylene, polyethylene terephthalate or the like. The support frame 2 includes a support frame body 21 and a protrusion portion 22 extending inward from an inner edge side of the support frame body 21 and having a smaller thickness than the support frame body 21. The protrusion portion 22 of the support frame 2 may be regarded as a portion of an inner peripheral edge side of the support frame 2, namely an inner peripheral edge portion of the support frame 2. The protrusion portion 22 (the inner peripheral edge portion) of the support frame 2 is bonded to the outer peripheral edge portion E of the membrane electrode assembly 5 by an adhesive layer 10. In a configuration in which the protrusion portion 22 is bonded to the outer peripheral edge portion E, a gap G is located between an inner end portion of the protrusion portion 22 and an outer end portion of the second gas diffusion layer 3c.

The adhesive layer 10 bonds the protrusion portion 22 and the outer peripheral edge portion E of the membrane electrode assembly 5. Furthermore, the adhesive layer 10 covers the outer peripheral edge portion E located at a radially outside of the gap G between the second gas diffusion layer 3c and the support frame 2. The adhesive layer 10 has ultraviolet curability in which the adhesive layer 10 is cured by ultraviolet rays and heat curability in which the adhesive layer 10 is cured by heating. The adhesive layer 10 is an adhesive agent which has both properties at the same time. The wavelength of ultraviolet rays may be, for example, about 200 to 400 nm. The heating temperature may be, for example, about 80 to 140° C. The adhesive layer 10 may be, for example, a polyisobutylene (PIB)-based adhesive agent. In another example, the adhesive layer 10 may be a mixed adhesive agent obtained by mixing an adhesive agent having ultraviolet curability and not having heat curability and an adhesive agent having heat curability and not having ultraviolet curability.

The unit fuel cell 1 further includes separators 4, namely an anode separator 4a and a cathode separator 4c. The peripheral edge portion of the anode separator 4a makes contact with the support frame body 21. The central portion of the anode separator 4a existing at the inner side of the peripheral edge portion makes contact with the first gas diffusion layer 3a. A plurality of fuel-gas-supplying grooves extending parallel to one another is formed in the central portion of the anode separator 4a. A plurality of fuel gas supply paths 32 is formed by the grooves and the membrane-electrode-gas diffusion layer assembly 6. A fuel gas supplied from the fuel gas supply paths 32 is supplied to the membrane electrode assembly 5 via the first gas diffusion layer 3a. The peripheral edge portion of the cathode separator 4c makes contact with the support frame body 21. The central portion of the cathode separator 4c existing at the inner side of the peripheral edge portion makes contact with the second gas diffusion layer 3c. A plurality of oxidant-gas-supplying grooves extending parallel to one another is formed at the central portion of the cathode separator 4c. A plurality of oxidant gas supply paths 31 is formed by the grooves and the membrane-electrode-gas diffusion layer assembly 6. An oxidant gas supplied from the oxidant gas supply paths 31 is supplied to the membrane electrode assembly 5 via the second gas diffusion layer 3c. In two adjoining unit fuel cells 1, the cathode separator 4c of one of the unit fuel cells 1 and the anode separator 4a of the other of the unit fuel cells 1 make contact with each other. As a result, there are formed cooling medium supply paths 30, each of which is interposed between two oxidant gas supply paths 31 and two fuel gas supply paths 32. The cathode separator 4c and the anode separator 4a are formed by a material which does not allow an oxidant gas (e.g., an air), a fuel gas (e.g., a hydrogen gas) and a cooling medium (e.g., water) to pass therethrough and which has electric conductivity, for example, metal such as stainless steel or the like, or a carbon fiber/resin composite material.

Figure 2:
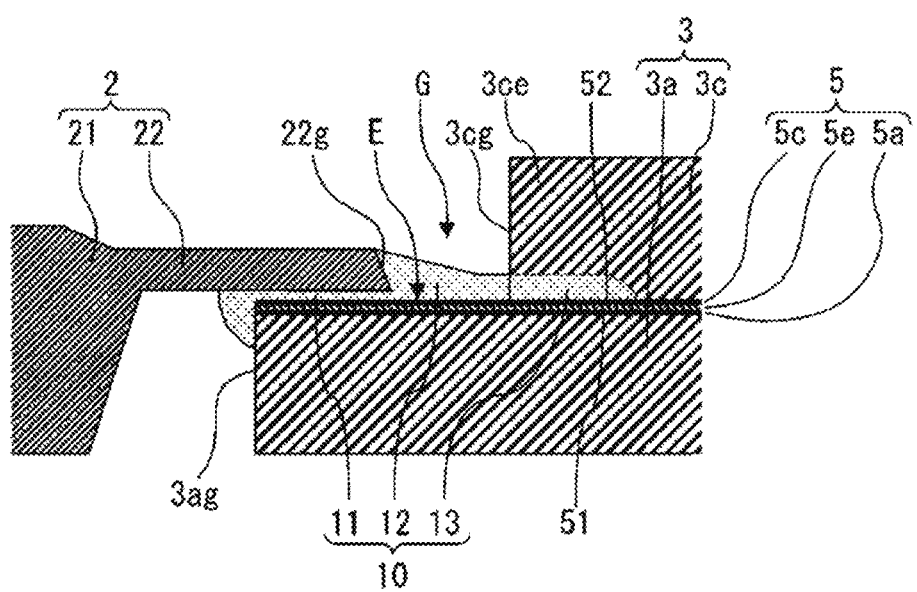
FIG. 2 is a partially enlarged view of the fuel cell stack illustrated in FIG. 1.

FIG. 2 is a partially enlarged view of FIG. 1. As illustrated in FIG. 2, the adhesive layer 10 is located on the outer peripheral edge portion E of the membrane electrode assembly 5 at the electrode catalyst layer 5c. The adhesive layer 10 includes an outer portion 11 existing on an outer region of the outer peripheral edge portion E, an inner portion 13 existing on an inner region of the outer peripheral edge portion E, and a central portion 12 existing on a central region of the outer peripheral edge portion E. The outer portion 11 is interposed between the protrusion portion 22 of the support frame 2 and the membrane electrode assembly 5. The outer portion 11 of the adhesive layer 10 extends from an end portion 22g of the protrusion portion 22 of the support frame 2 to an outer edge 3ag of the first gas diffusion layer 3a and bonds the protrusion portion 22 and the membrane electrode assembly 5. Furthermore, a part of the inner portion 13 is interposed between an outer peripheral edge portion 3ce of the second gas diffusion layer 3c and the membrane electrode assembly 5 to bind the outer peripheral edge portion 3ce of the second gas diffusion layer 3c and the membrane electrode assembly 5 together. Other parts of the inner portion 13 are absorbed into the outer peripheral edge portion 3ce of the second gas diffusion layer 3c. The central portion 12 of the adhesive layer 10 fills the gap G between the end portion 22g of the protrusion portion 22 and the end portion 3cg of the second gas diffusion layer 3c. Since the outer peripheral edge portion E of the gap G not covered with the gas diffusion layer 3 is covered by the adhesive layer 10, no region is exposed to the outside at the outer peripheral edge portion E. In an alternative example not illustrated, the support frame 2 and the second gas diffusion layer 3c are brought close to each other and the central portion 12 of the adhesive layer 10 is not substantially exposed.

Next, descriptions will be made on a method of manufacturing a unit fuel cell. FIGS. 3 to 8 are partial sectional views illustrating respective processes of a method of manufacturing a unit fuel cell 1.

Figure 3:
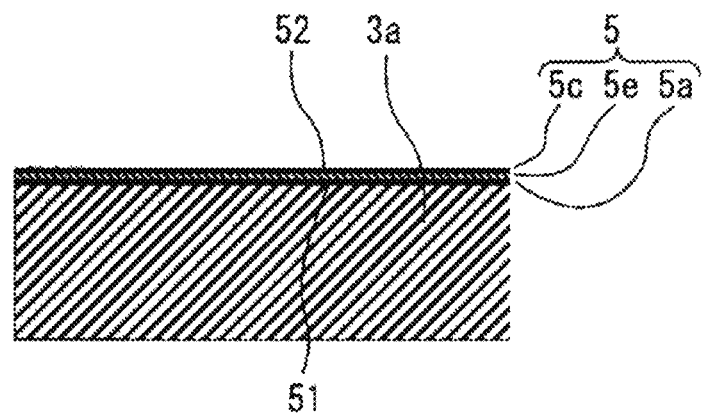
FIG. 3 is a partial sectional view illustrating a process of a method of manufacturing a unit fuel cell.

First, as illustrated in FIG. 3, the membrane electrode assembly 5 having the first gas diffusion layer 3a disposed on one side surface 51 thereof is prepared. The first gas diffusion layer 3a and the membrane electrode assembly 5 are heated, compressed and bonded in advance by, e.g., a hot press process.

Figure 4:
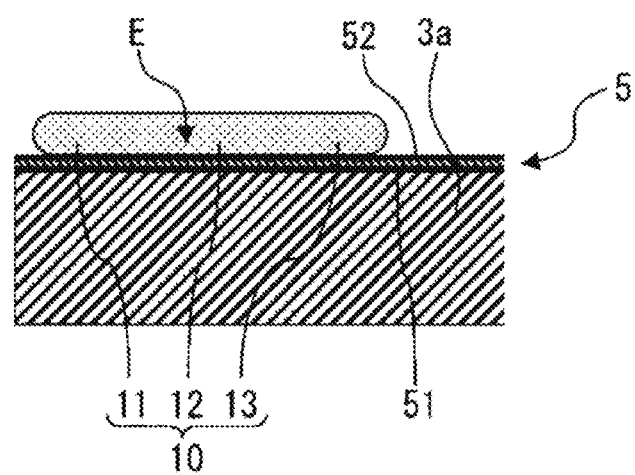
FIG. 4 is a partial sectional view illustrating a process of a method of manufacturing a unit fuel cell.

Then, as illustrated in FIG. 4, the adhesive layer 10 having ultraviolet curability and heat curability is disposed on the outer peripheral edge portion E of the other side surface 52 of the membrane electrode assembly 5. The adhesive layer 10 includes the outer portion 11 existing on the outer region of the outer peripheral edge portion E, the inner portion 13 existing on the inner region of the outer peripheral edge portion E, and the central portion 12 existing on the central region of the outer peripheral edge portion E. The adhesive layer 10 may be, for example, a polyisobutylene-based adhesive agent. The formation method of the adhesive layer 10 may be, for example, a method which makes use of a dispenser or a method which makes use of screen printing.

Figure 5:
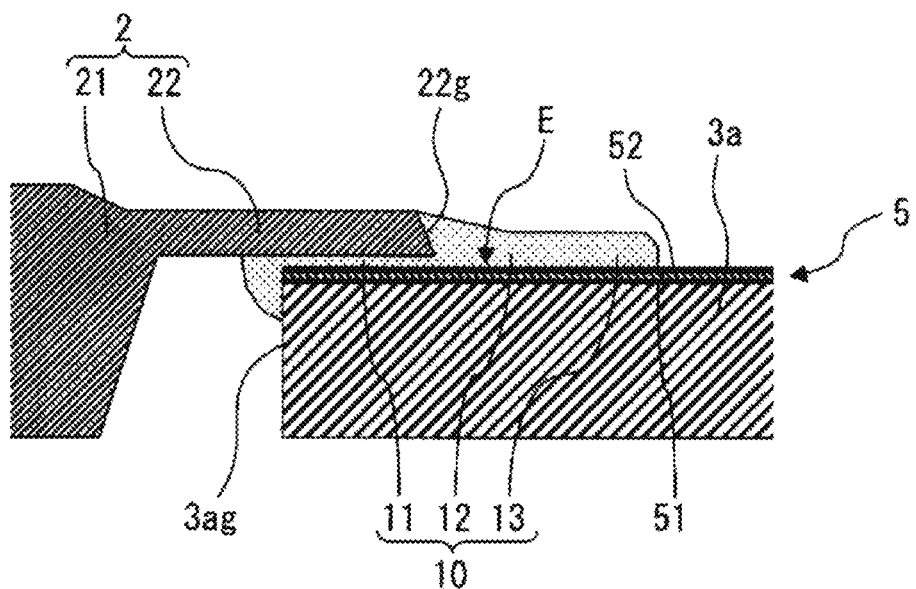
FIG. 5 is a partial sectional view illustrating a process of a method of manufacturing a unit fuel cell.
Figure 6:
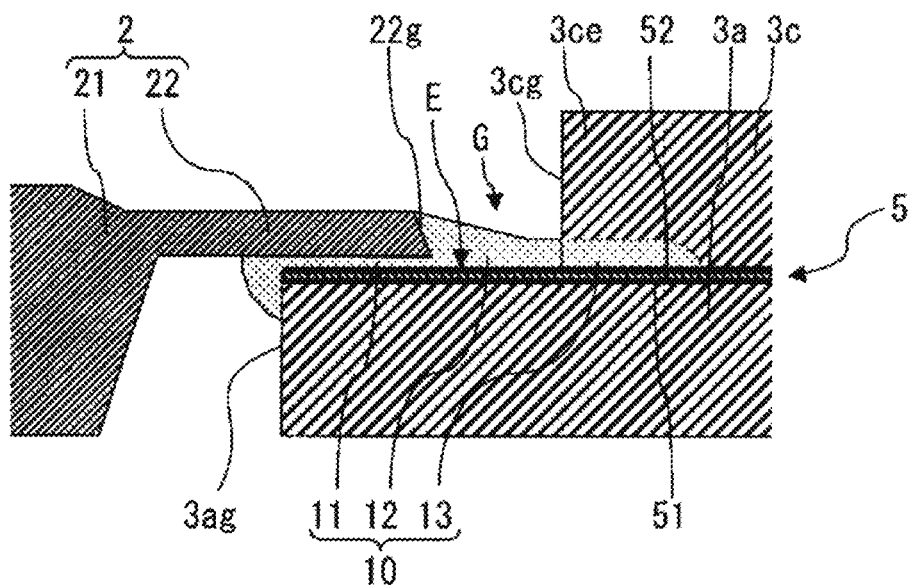
FIG. 6 is a partial sectional view illustrating a process of a method of manufacturing a unit fuel cell.

Subsequently, as illustrated in FIGS. 5 and 6, the inner peripheral edge portion (the protrusion portion 22) of the support frame 2 is disposed on the outer portion 11 of the adhesive layer 10. The outer peripheral edge portion 3ce of the second gas diffusion layer 3c is disposed on the inner portion 13 of the adhesive layer 10.

Specifically, as illustrated in FIG. 5, the support frame 2 is first disposed so as to surround the membrane electrode assembly 5. The protrusion portion 22 of the support frame 2 is disposed on the outer portion 11 of the adhesive layer 10. At this time, the protrusion portion 22 is disposed by applying a load from above the protrusion portion 22. Thus, the adhesive agent of the outer portion 11 is crushed. As a result, at the outer side of the membrane electrode assembly 5, the adhesive agent reaches the outer edge 3ag of the first gas diffusion layer 3a. Consequently, it is possible to increase the bonding area of the membrane electrode assembly 5 and the support frame 2. Furthermore, at the inner side of the membrane electrode assembly 5, the adhesive agent covers the end portion 22g of the protrusion portion 22. The adhesive agent is partially extruded inward. For that reason, the inner portion 13 is slightly extended inward. Consequently, it is possible to reliably dispose the adhesive agent in the region where the outer peripheral edge portion 3ce of the second gas diffusion layer 3c is disposed. This makes it possible to reliably cover the outer peripheral edge portion E of the membrane electrode assembly 5.

Subsequently, as illustrated in FIG. 6, the second gas diffusion layer 3c is placed on the electrode catalyst layer 5c of the membrane electrode assembly 5. The outer peripheral edge portion 3ce of the second gas diffusion layer 3c is disposed on the inner portion 13 of the adhesive layer 10. Then, the second gas diffusion layer 3c is temporarily affixed to the membrane electrode assembly 5. At this time, the adhesive agent of the adhesive layer 10 is not irradiated with ultraviolet rays nor heated. Thus, the adhesive agent of the adhesive layer 10 is not cured and is kept in the state available immediately after the coating thereof. Accordingly, when the second gas diffusion layer 3c is disposed on the adhesive layer 10, the adhesive agent permeates into the porous body. Thus, the second gas diffusion layer 3c goes into the adhesive layer 10 and may finally make contact with the membrane electrode assembly 5 through a thin adhesive agent. Accordingly, the second gas diffusion layer 3c is not propped and raised up by the adhesive layer 10. As a result, there is no case where the oxidant gas supply paths 31 defined by the cathode separator 4c existing on the second gas diffusion layer 3c are closed in an otherwise raised portion, the fibers making up the second gas diffusion layer 3c are made fluffy in an otherwise raised portion, or an excessive surface pressure is applied to the membrane electrode assembly 5 existing under the adhesive layer 10.

In this regard, it does not matter which of the support frame 2 and the second gas diffusion layer 3c is first disposed on the adhesive layer 10. However, it is preferred that the support frame 2 is first disposed. If it is assumed that the second gas diffusion layer 3c is first disposed, when the support frame 2 is subsequently disposed on the outer portion 11, the adhesive agent of the outer portion 11 is crushed and is partially extruded toward the central portion 12. Thus, there is a possibility that the adhesive agent of the central portion 12 exists from the end portion 3cg of the second gas diffusion layer 3c to an upper side of the outer peripheral edge portion 3ce thereof. If so, there is a possibility that the adhesive agent closes the oxidant gas supply paths 31 defined by the cathode separator 4c existing on the second gas diffusion layer 3c.

Figure 7:
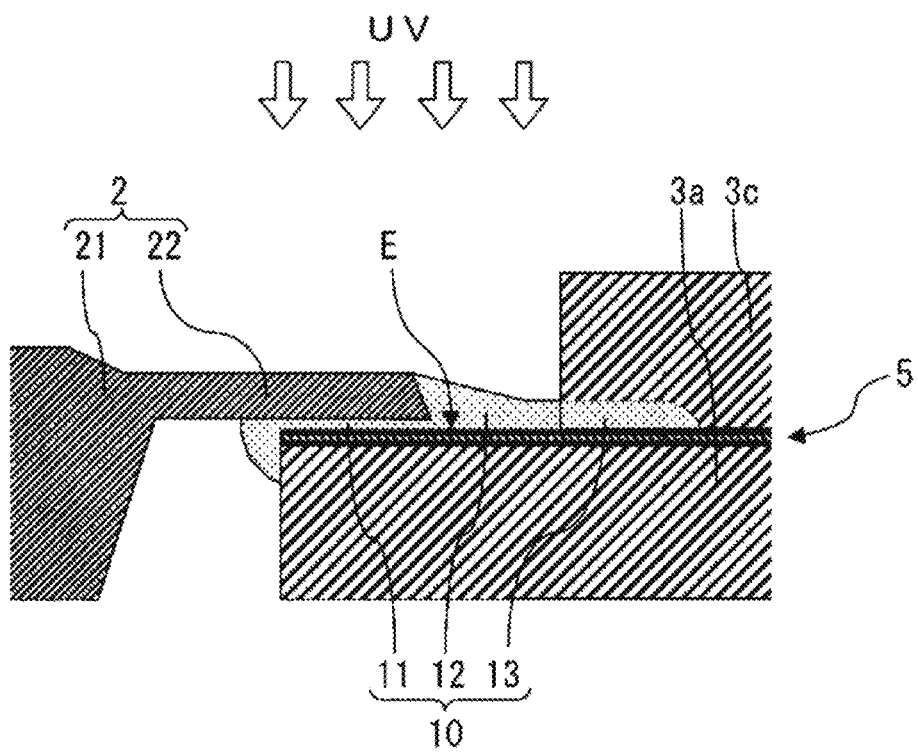
FIG. 7 is a partial sectional view illustrating a process of a method of manufacturing a unit fuel cell.
Figure 8:
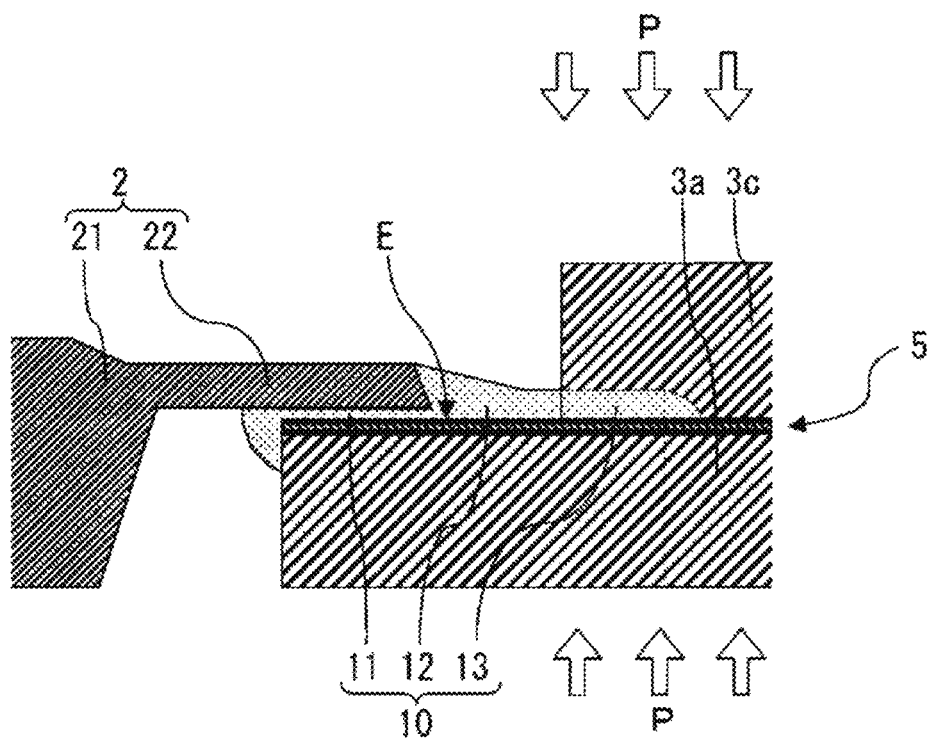
FIG. 8 is a partial sectional view illustrating a process of a method of manufacturing a unit fuel cell.

Thereafter, as illustrated in FIGS. 7 and 8, the adhesive layer 10 is cured to integrate the membrane electrode assembly 5, the second gas diffusion layer 3c and the support frame 2. Consequently, the membrane electrode assembly 5, the first gas diffusion layer 3a, the second gas diffusion layer 3c and the support frame 2 are integrated.

Specifically, as illustrated in FIG. 7, ultraviolet rays UV are first irradiated on the adhesive layer 10. In the case where a polyisobutylene-based adhesive agent is used as the adhesive agent of the adhesive layer 10, the irradiation condition of ultraviolet rays may be, for example, 4500 mJ/cm$^2$. At this time, the ultraviolet rays UV may pass through the protrusion portion 22 because the thickness of the protrusion portion 22 is sufficiently small. Thus, the central portion 12 and the outer portion 11 of the adhesive layer 10 are primarily cured, whereby the protrusion portion 22 and the outer peripheral edge portion E are bound together. Since the second gas diffusion layer 3c does not allow the ultraviolet rays to pass therethrough, the inner portion 13 of the adhesive layer 10 is not cured. Thus, the second gas diffusion layer 3c and the outer peripheral edge portion E are not bound together. By this process, the membrane electrode assembly 5 and the support frame 2 are integrated. At this time, heating is not performed. Accordingly, the support frame 2 is not heated. For that reason, the support frame 2 is not affected by heating. Thus, the thermal deformation of the support frame 2 is prevented.

Subsequently, as illustrated in FIG. 8, the membrane electrode assembly 5 and the second gas diffusion layer 3c are heated. For example, the membrane electrode assembly 5 and the second gas diffusion layer 3c are heated and compressed by a hot press process. The hot press conditions may be, for example, 140° C. and 5 minutes. Thus, the electrode catalyst layer 5c and the second gas diffusion layer 3c are joined together. By this process, the membrane electrode assembly 5 and the second gas diffusion layer 3c are integrated. As a result, the membrane-electrode-gas diffusion layer assembly 6 including the support frame 2 is formed. At this time, the inner portion 13 of the adhesive layer 10, namely the adhesive layer 10 within the second gas diffusion layer 3c, is mainly thermally cured by the heating in the hot press process. Thus, the membrane electrode assembly 5 and the second gas diffusion layer 3c are joined together by the adhesive agent at the inner portion 13 of the adhesive layer 10. At this time, the membrane electrode assembly 5 and the second gas diffusion layer 3c are heated. The support frame 2 is not heated. For that reason, the support frame 2 is not affected by the heating. Thus, the thermal deformation of the support frame 2 is prevented.

In the aforementioned example, one side surface 51 of the membrane electrode assembly 5 (existing at the side of the first gas diffusion layer 3a) is an anode side surface, and the other side surface 52 of the membrane electrode assembly 5 (existing at the side of the second gas diffusion layer 3c) is a cathode side surface. In another example, one side surface of the membrane electrode assembly 5 may be a cathode side surface, and the other side surface of the membrane electrode assembly 5 may be an anode side surface.

Figure 9:
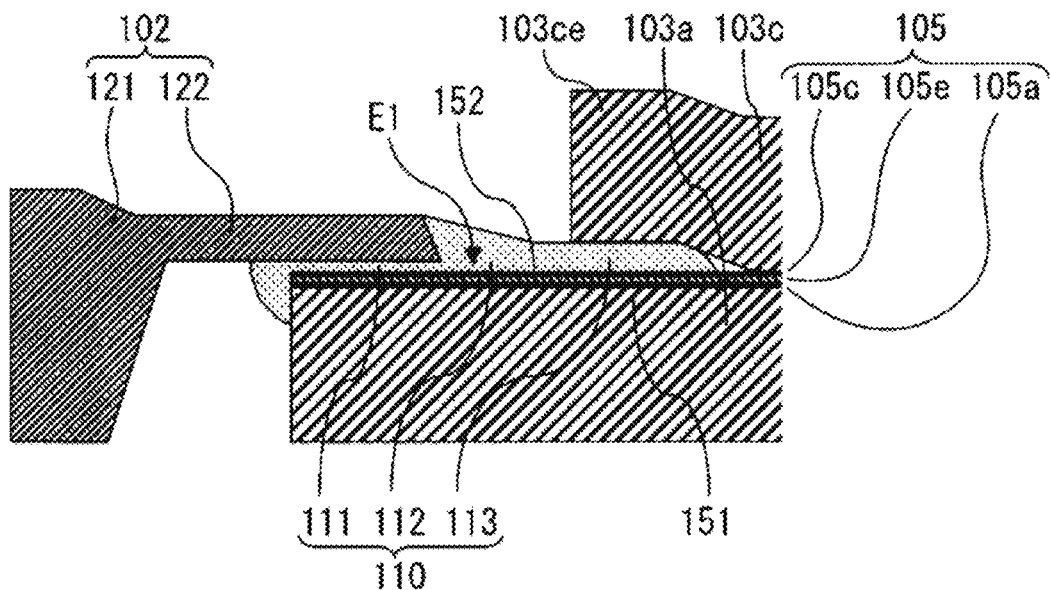
FIG. 9 is a partial sectional view illustrating a configuration example of a fuel cell stack of a comparative example.

The characteristics of the unit fuel cell 1 manufactured by the aforementioned manufacturing method (hereinafter referred to as "the unit cell of the example") were compared with the characteristics of a unit fuel cell manufactured by a manufacturing method differing from the aforementioned manufacturing method (hereinafter referred to as "the unit cell of the comparative example"). The unit cell of the comparative example has the configuration illustrated in FIG. 9 and uses the following manufacturing method. That is to say, a membrane electrode assembly 105 having a first gas diffusion layer 103a disposed on one side surface 151 thereof is first prepared. Then, an adhesive layer 110 having ultraviolet curability is formed on an outer peripheral edge portion E1 of the other side surface 152 of the membrane electrode assembly 105. Subsequently, an inner peripheral edge portion 122 of a support frame 102 is disposed on an outer portion 111 of the adhesive layer 110. Thereafter, the adhesive layer 110 is cured with ultraviolet rays to bond the support frame 102 and the membrane electrode assembly 105 together. Subsequently, an outer peripheral edge portion 103ce of a second gas diffusion layer 103c is disposed on an inner portion 113 of the adhesive layer 110. Thereafter, the first gas diffusion layer 103a, the membrane electrode assembly 105 and the second gas diffusion layer 103c are hot-pressed to form a membrane-electrode-gas diffusion layer assembly including the support frame 102. In this manufacturing method, the support frame 102 is not heated and, therefore, is not thermally deformed. However, the outer peripheral edge portion 103ce of the second gas diffusion layer 103c is propped and raised up by the adhesive layer 110.

Figure 10:
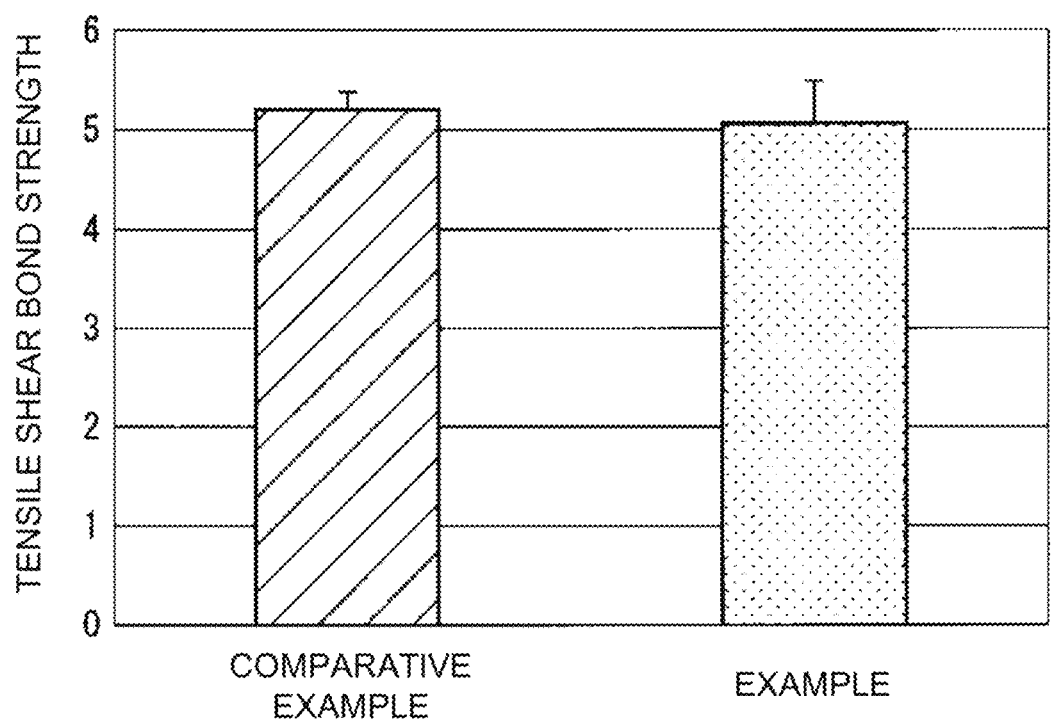
FIG. 10 is a graph illustrating the bond strength of unit fuel cells of a comparative example and an example.

First, the bond strength of the membrane-electrode-gas diffusion layer assembly and the support frame was measured by a tensile shear bond strength test. FIG. 10 is a graph illustrating the tensile shear bond strength of the unit cell of the comparative example and the unit cell of the example. The vertical axis indicates the tensile shear bond strength having an arbitrary unit (a.u.). It was revealed that the tensile shear bond strength of the unit cell of the comparative example is substantially equal to the tensile shear bond strength of the unit cell of the example. Accordingly, it can be said that the unit cell of the embodiment has the bond strength which is not inferior to that of the unit cell of the comparative example.

Figure 11:
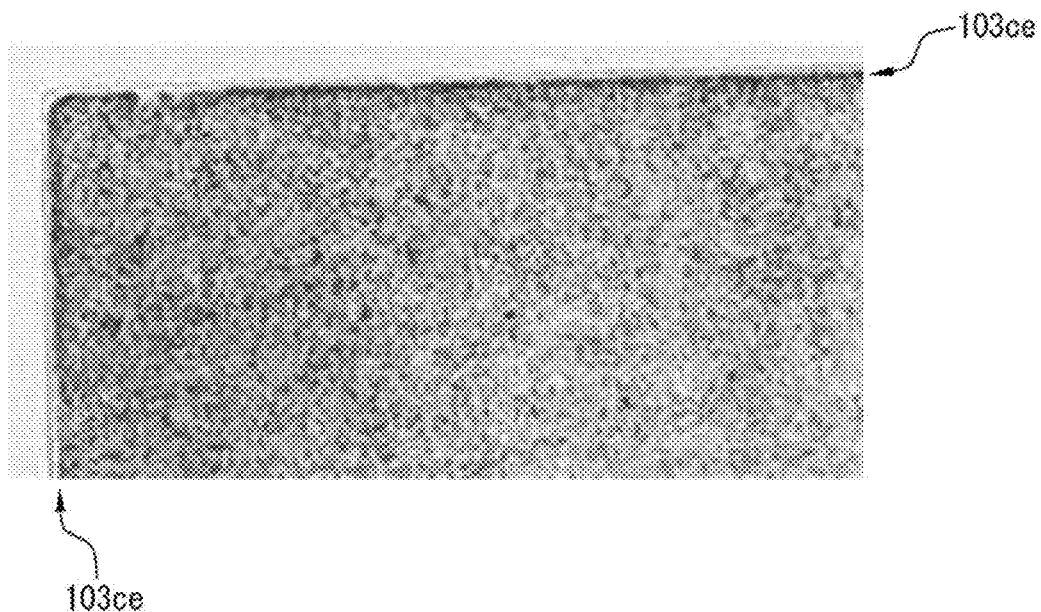
FIG. 11 is a pressure-sensitive paper photo illustrating a surface pressure distribution of a unit fuel cell of a comparative example.
Figure 12:
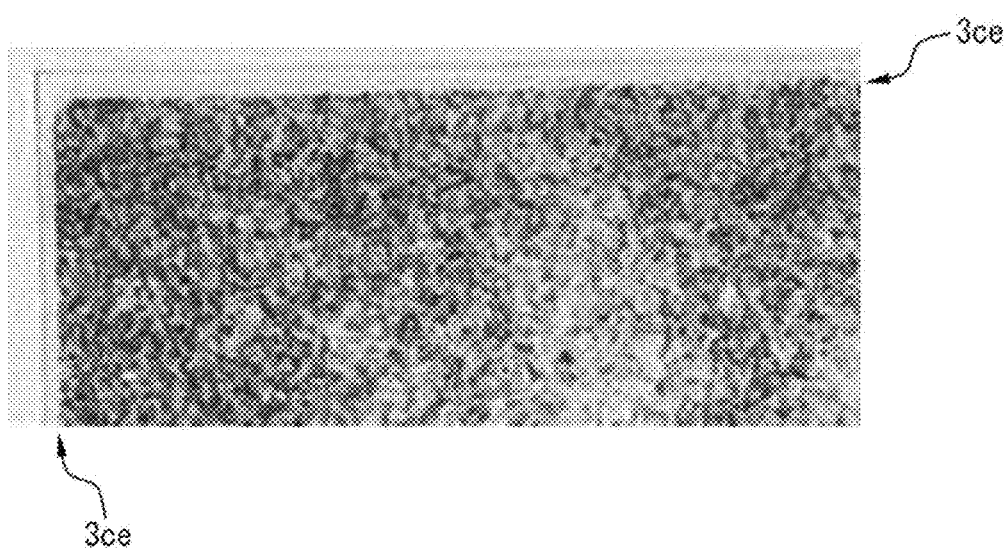
FIG. 12 is a pressure-sensitive paper photo illustrating a surface pressure distribution of a unit fuel cell of an example.

Then, the surface pressure distribution available when an average surface pressure of 1 MPa is applied between one side surface (the first gas diffusion layer side surface) and the other side surface (the second gas diffusion layer side surface) of the membrane-electrode-gas diffusion layer assembly was measured by placing a pressure-sensitive paper on the second gas diffusion layer. FIGS. 11 and 12 are pressure-sensitive paper photos illustrating the surface pressure distribution of the unit cell of the comparative example and the surface pressure distribution of the unit cell of the embodiment, respectively. In the unit cell of the comparative example, coloring at the outer peripheral edge portion 103ce of the second gas diffusion layer 103c is relatively dark. Thus, it was found that the surface pressure is excessively applied to the outer peripheral edge portion 103ce of the second gas diffusion layer 103c. Accordingly, in the unit cell of the comparative example, it was confirmed that in the outer peripheral edge portion 103ce of the second gas diffusion layer 103c, the second gas diffusion layer 103c is overlapped with the adhesive layer 110 and is raised up (see FIG. 9). On the other hand, in the unit cell of the embodiment, coloring is less biased as a whole, including the outer peripheral edge portion 3ce of the second gas diffusion layer 3c. Thus, it was found that the surface pressure is substantially uniformly applied as a whole to the second gas diffusion layer 3c. Accordingly, in the unit cell of the embodiment, it was confirmed that it is possible to prevent the second gas diffusion layer 3c from being overlapped with the adhesive layer 10 and being raised up.

In the aforementioned embodiment, the adhesive layer 10 is coated on the outer peripheral edge portion E of the membrane electrode assembly 5 prior to disposing the support frame 2 and the second gas diffusion layer 3c. It is therefore possible to reliably prevent exposure of the outer peripheral edge portion E. Since the support frame 2 is bonded to the membrane electrode assembly 5 using the adhesive layer 10 having ultraviolet curability, it is possible to avoid thermal deformation of the support frame 2. Since the second gas diffusion layer 3c is disposed on the adhesive layer 10 prior to curing the adhesive layer 10, the adhesive layer 10 may permeate the second gas diffusion layer 3c. It is therefore possible to prevent the second gas diffusion layer 3c from being overlapped with the upper portion of the adhesive layer 10 and being raised up.

According to the method of manufacturing a unit fuel cell described above, it is possible to reliably integrate the support frame 2, the gas diffusion layer 3 and the membrane electrode assembly 5 without exposing the outer peripheral edge portion E of the membrane electrode assembly 5 and without deforming the support frame 2 with heat or the like.

What is claimed is:

1. A method of manufacturing a unit fuel cell, comprising steps of following sequential order:
   integrating a first gas diffusion layer on a first side surface of a membrane electrode assembly consisting of an electrolyte membrane and electrode catalyst layers, one of which is disposed at one side of the electrolyte membrane and the other of which is disposed at the other side of the electrolyte membrane;
   forming an adhesive layer having ultraviolet curability and heat curability on an outer peripheral edge portion of a second side surface of the membrane electrode assembly;
   disposing a support frame which supports the membrane electrode assembly at an outer periphery of the membrane electrode assembly so that an inner peripheral edge portion of the support frame is disposed on an outer portion of the adhesive layer;
   disposing a second gas diffusion layer on the second side surface of the membrane electrode assembly so that an outer peripheral edge portion of the second gas diffusion layer is disposed on an inner portion of the adhesive layer;
   irradiating ultraviolet rays on the adhesive layer so that the membrane electrode assembly and the support frame are integrated; and
   heating the membrane electrode assembly and the second gas diffusion layer, and not heating the support frame so that the membrane electrode assembly and the second gas diffusion layer are integrated after the step of irradiating ultraviolet rays.

2. The method according to claim 1, wherein disposing the second gas diffusion layer on the inner portion of the adhesive layer is performed after disposing the support frame on the outer portion of the adhesive layer.

3. The method according to claim 1, wherein the support frame includes a support frame body and a protrusion portion extending inward of the support frame body from an inner edge side of the support frame body and having a smaller thickness than the support frame body,
   the inner peripheral edge portion of the support frame includes the protrusion portion, and
   the protrusion portion is disposed on the outer portion of the adhesive layer in disposing the support frame.

4. The method according to claim 1, wherein in disposing the support frame and disposing the second gas diffusion layer, a gap is formed between the inner peripheral edge portion of the support frame and an outer end portion of the second gas diffusion layer, and the adhesive layer covers the outer peripheral edge portion of the membrane electrode assembly positioned in the gap.

5. The method according to claim 1, wherein during heating the membrane electrode assembly and the second gas diffusion layer, the inner portion of the adhesive layer is heated.

* * * * *